US012499200B2

(12) United States Patent
Don et al.

(10) Patent No.: US 12,499,200 B2
(45) Date of Patent: Dec. 16, 2025

(54) SECURE COMPONENT VERIFICATION USING NFC

(71) Applicant: Dell Products L.P., Hopkinton, MA (US)

(72) Inventors: Arieh Don, Newton, MA (US); Efi Levi, Be'er-Sheva (IL); Lior Benisty, Be'er-Sheva (IL)

(73) Assignee: Dell Products L.P., Hopkinton, MA (US)

( * ) Notice: Subject to any disclaimer, the term of this patent is extended or adjusted under 35 U.S.C. 154(b) by 105 days.

(21) Appl. No.: 18/443,454

(22) Filed: Feb. 16, 2024

(65) Prior Publication Data

US 2025/0265325 A1   Aug. 21, 2025

(51) Int. Cl.
*G06F 21/35* (2013.01)
*G06F 21/60* (2013.01)
*G06F 21/73* (2013.01)

(52) U.S. Cl.
CPC ............ *G06F 21/35* (2013.01); *G06F 21/602* (2013.01); *G06F 21/73* (2013.01)

(58) Field of Classification Search
CPC ......... G06F 21/35; G06F 21/602; G06F 21/73
See application file for complete search history.

(56) References Cited

U.S. PATENT DOCUMENTS

| | | | |
|---|---|---|---|
| 9,967,749 B2 * | 5/2018 | Taylor | H04L 9/3236 |
| 11,979,202 B2 * | 5/2024 | Wang | H04B 5/77 |
| 12,050,723 B2 * | 7/2024 | Peacock | G08B 13/14 |
| 2015/0089221 A1 * | 3/2015 | Taylor | H04L 9/3236 |
| | | | 713/168 |
| 2022/0335760 A1 * | 10/2022 | Low | H04L 9/0825 |

* cited by examiner

*Primary Examiner* — Quazi Farooqui
(74) *Attorney, Agent, or Firm* — Anderson Gorecki LLP

(57) ABSTRACT

Electronic hardware components include integrated near field communications (NFC) modules configured to respond to authentication messages sent by a baseboard management controller (BMC). The authentication messages include cryptographic authentication challenges. The hardware component NFC modules are configured with private keys to decrypt messages sent by the BMC and digitally sign information such as VPD and SN that identify the hardware component. Secure component verification using NFC helps to detect component substitution attacks.

14 Claims, 6 Drawing Sheets

Storage System 10

Storage Director 112

SECURE COMPONENT VERIFICATION USING NFC

TECHNICAL FIELD

The subject matter of this disclosure is generally related to computing and data storage systems.

BACKGROUND

A data center can include a large number of rack-based servers and data storage nodes such as Network-Attached Storage (NAS), Storage Area Networks (SANs), and storage arrays. The data storage nodes maintain storage objects that can be contemporaneously accessed by instances of host applications running on the servers. Some data centers are used to maintain highly sensitive data that may be targeted by malicious attackers. Network-based cyber-attacks are a well-known attack vector. A somewhat less well-known attack vector is component substitution. A component substitution attack is implemented by substituting a maliciously-altered hardware component for an unaltered hardware component. The attacker does not necessarily need direct access to the equipment to perform the substitution because maliciously altered replacement components can be innocently installed by authorized personnel. The maliciously-altered hardware component may be designed to facilitate a subsequent cyber-attack, send data to the attacker, and compromise security in various other ways. Procedures are known for protecting data center equipment from malicious tampering during transit between a manufacturing facility and the data center in which the equipment is deployed. However, it would be desirable to enable on-demand remote verification of a wider variety of components to determine whether any components have been replaced with maliciously altered components at any time before or after deployment.

SUMMARY

A method according to some implementations comprises: a baseboard management controller transmitting an authentication message to a hardware component using near field communications; the hardware component receiving the authentication message via a near field communications module integrated into the hardware component; the hardware component sending a reply to the authentication message using near field communications; and the baseboard management controller receiving the reply and performing authentication of the hardware component using information in the reply.

An apparatus according to some implementations comprises: a baseboard management controller configured to transmit an authentication message to a hardware component using near field communications and perform authentication of the hardware component using information in a reply; and a near field communications module integrated into the hardware component and configured to receive the authentication message, generate the reply, and send the reply to the baseboard management controller using near field communications.

According to some implementations, a non-transitory computer-readable storage medium stores instructions that when executed by a computer cause the computer to perform a method comprising: a baseboard management controller transmitting an authentication message to a hardware component using near field communications; the hardware component receiving the authentication message via a near field communications module integrated into the hardware component; the hardware component sending a reply to the authentication message using near field communications; and the baseboard management controller receiving the reply and performing authentication of the hardware component using information in the reply.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

Figure 1:
FIG. 1 illustrates a storage system in which secure component verification using near field communication (NFC) is implemented.
Figure 2:
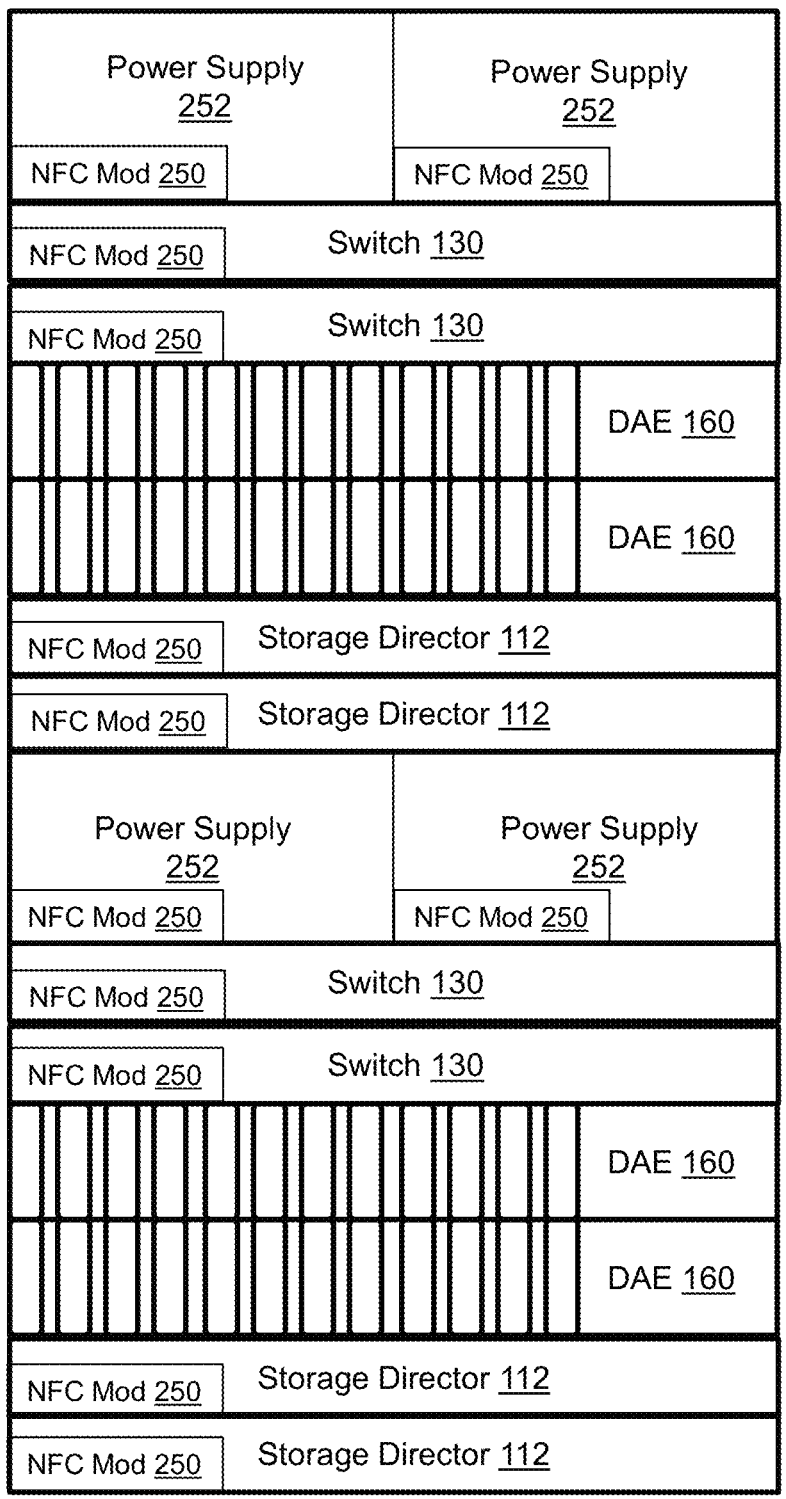
FIG. 2 illustrates rack-mounted components in one of the chassis shown in FIG. 1.
Figure 3:
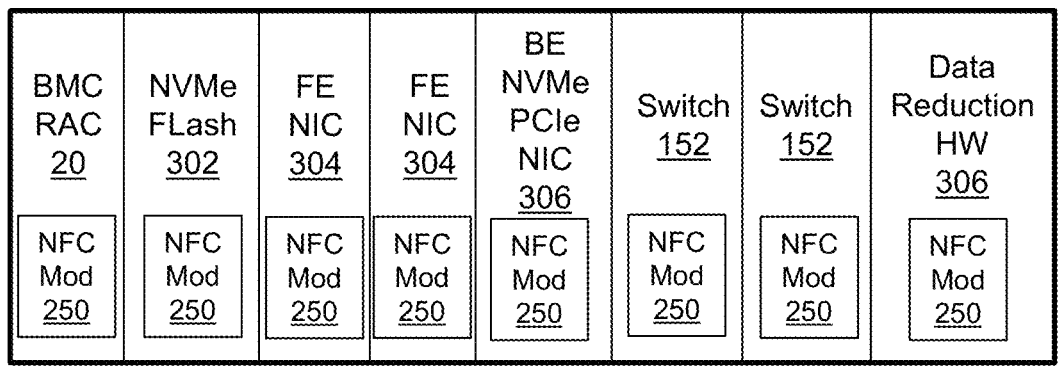
FIG. 3 illustrates components of one of the storage directors of FIG. 2.
Figure 3:
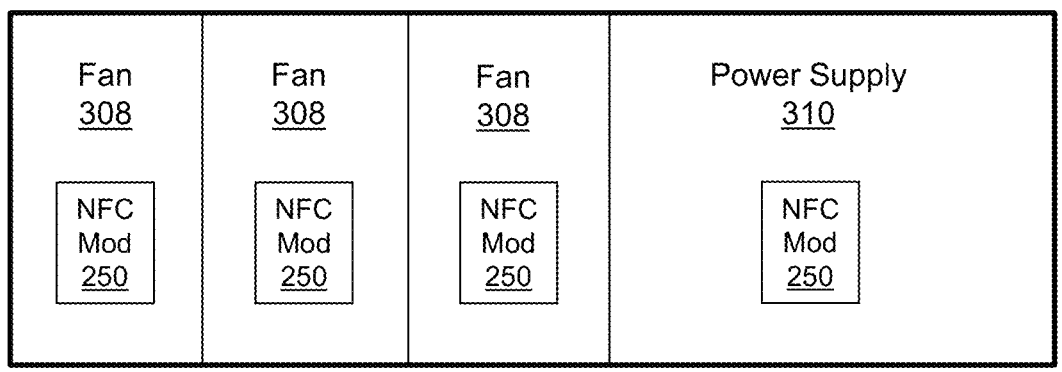
Figure 4:
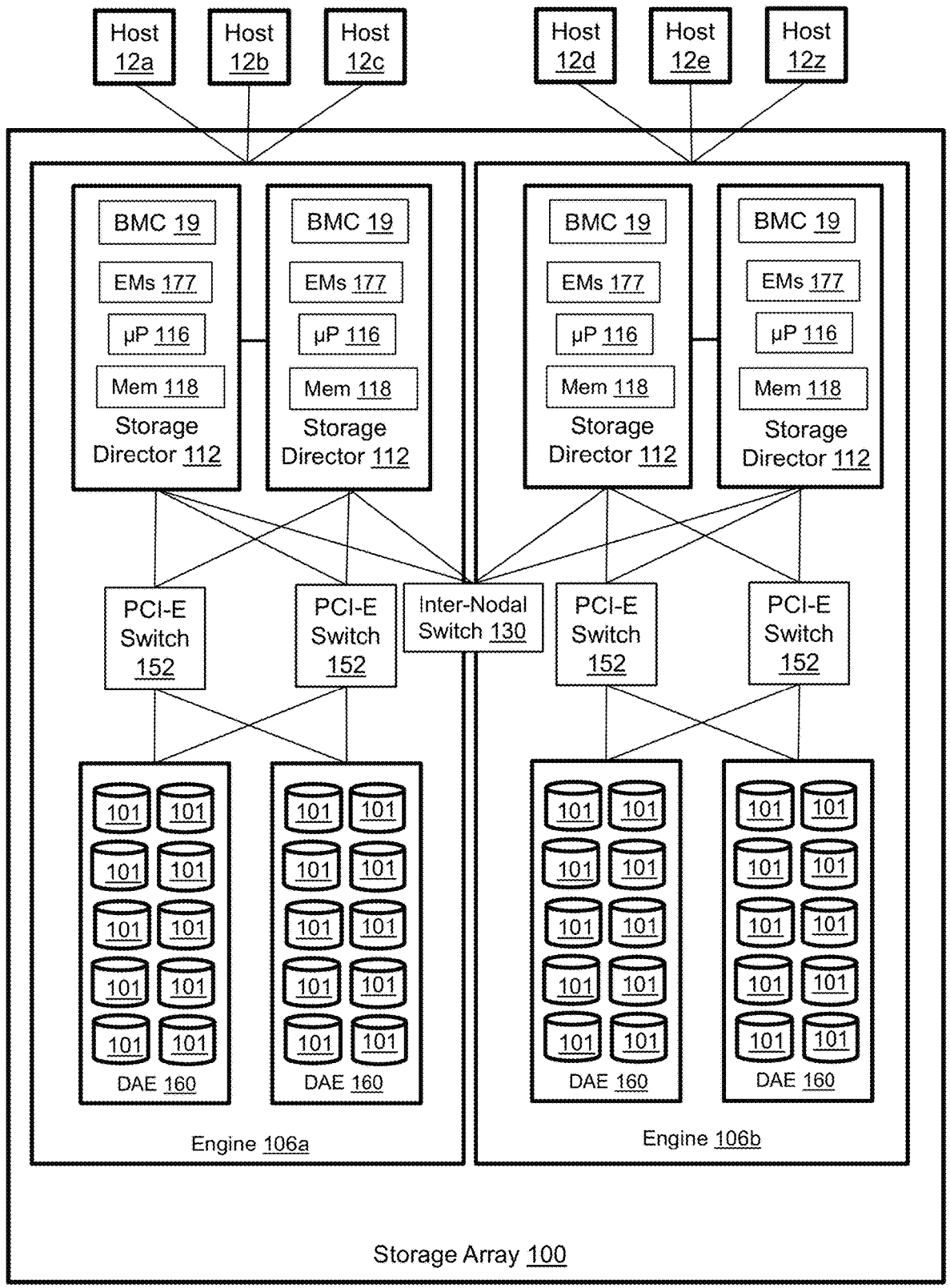
FIG. 4 is a block diagram of a storage array.

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Referring to FIGS. 1 through 4, storage system 10 includes rack-based storage arrays 100 within two protective housings known as chassis 200. Each storage array includes one or more engines 106 and multiple power supplies 252. The engines are interconnected via redundant inter-nodal channel-based InfiniBand switch fabrics 130. Each engine includes disk array enclosures (DAEs) 160 and a pair of peripheral component interconnect express (PCI-e) interconnected compute nodes known as storage directors 112. Within each engine, the storage directors and DAEs are interconnected via redundant PCI-E switches 152. Each DAE 160 includes managed drives 101 that are non-volatile storage media that may be of any type, e.g., solid-state drives (SSDs) based on nonvolatile memory express (NVMe) and EEPROM technology such as NAND and NOR flash memory.

Each storage director 112 is implemented as a separate printed circuit board and includes resources such as at least one multi-core processor 116, local memory 118, data reduction hardware 306, back-end and front-end network interface cards (NICs) 306, 304, NVMe flash 302, a baseboard management controller (BMC) 19, BMC remote access card (RAC) 20, cooling fans 308, and a power supply 310. Processor 116 may include central processing units (CPUs), graphics processing units (GPUs), or both, in multiple sockets. The local memory 118 may include a hierarchy of volatile media such as dynamic random-access memory (DRAM), non-volatile memory (NVM) such as storage class memory (SCM), or both, some of which is on the motherboard and some of which may be off the motherboard. The front-end (FE) NICs 304 are used for communicating with host servers 12a-12z for servicing IOs from the host servers. The processors 116 run threads of emulations (EMs 177) for performing different storage-related tasks and functions. Front-end emulations handle communications with the host servers. For example, front-end emulations receive IO commands from host servers and return data and write acknowledgements to the host servers. Back-end emulations handle communications with managed drives 101 in the DAEs 160. Data services emulations process IOs. Remote data services emulations handle communications with other storage systems, e.g., other storage arrays for remote replication and remote snapshot creation.

The BMCs 19 are specialized system-on-a-chip processors configured to enable and perform remote monitoring and management of hardware components. Each BMC 19 resides on the main motherboard of an associated storage director 112 and can be remotely accessed via a network connection through the BMC RAC 20 of that storage director. BMCs can monitor hardware component status based on sensors, logs, flash BIOS/UEFI firmware, and console access to the monitored components. Further, the BMCs are configured to authenticate hardware components using public key cryptography and component-specific information such as vendor product descriptions (VPDs) and component serial numbers (SNs) that uniquely identify each hardware component. Each monitored hardware component has an integrated NFC module 250 that can be queried by a BMC. The BMCs 19 have integrated NFC modules 250 or local NFC modules on their respective motherboards. The NFC modules enable secure component verification to be performed wirelessly, remotely and on demand. This is advantageous because some components may not have direct wired connections with the BMC. NFC transactions are also typically fast and efficient. The NFC transactions are encrypted to protect the data being transmitted, thereby helping to ensure that sensitive information remains confidential and cannot be easily intercepted by malicious actors.

Figure 5:
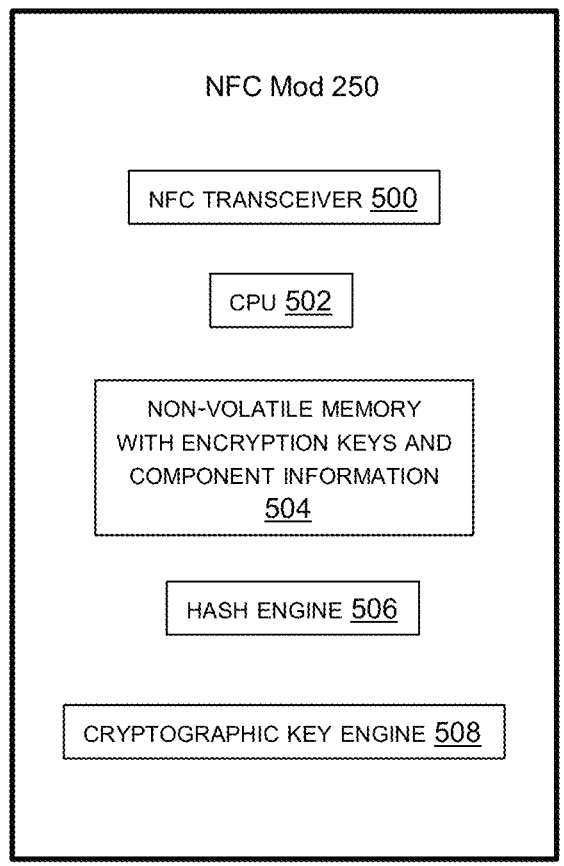
FIG. 5 is a block diagram of an NFC module.

FIG. 5 is a block diagram of an NFC module 250. The NFC module includes a transceiver 500, CPU 502, non-volatile memory 504, a hash engine 506, and a cryptographic key engine 508. The transceiver enables the NFC module to receive and transmit wirelessly at short range, which in the present disclosure is 3 feet or less. NFC has incorporated the ISO 15693 standard, which offers a maximum read range of about 3 feet. Multiple NFC modules, antennas, or relays may be deployed within a chassis to locate every monitored hardware component within communication range. The encryption keys and component information are stored in the non-volatile memory. The encryption keys may include public keys and private keys. The component information may include the VPD and SN of the hardware component with which the NFC module is integrated, e.g., at the time of manufacture of the hardware component.

Figure 6:
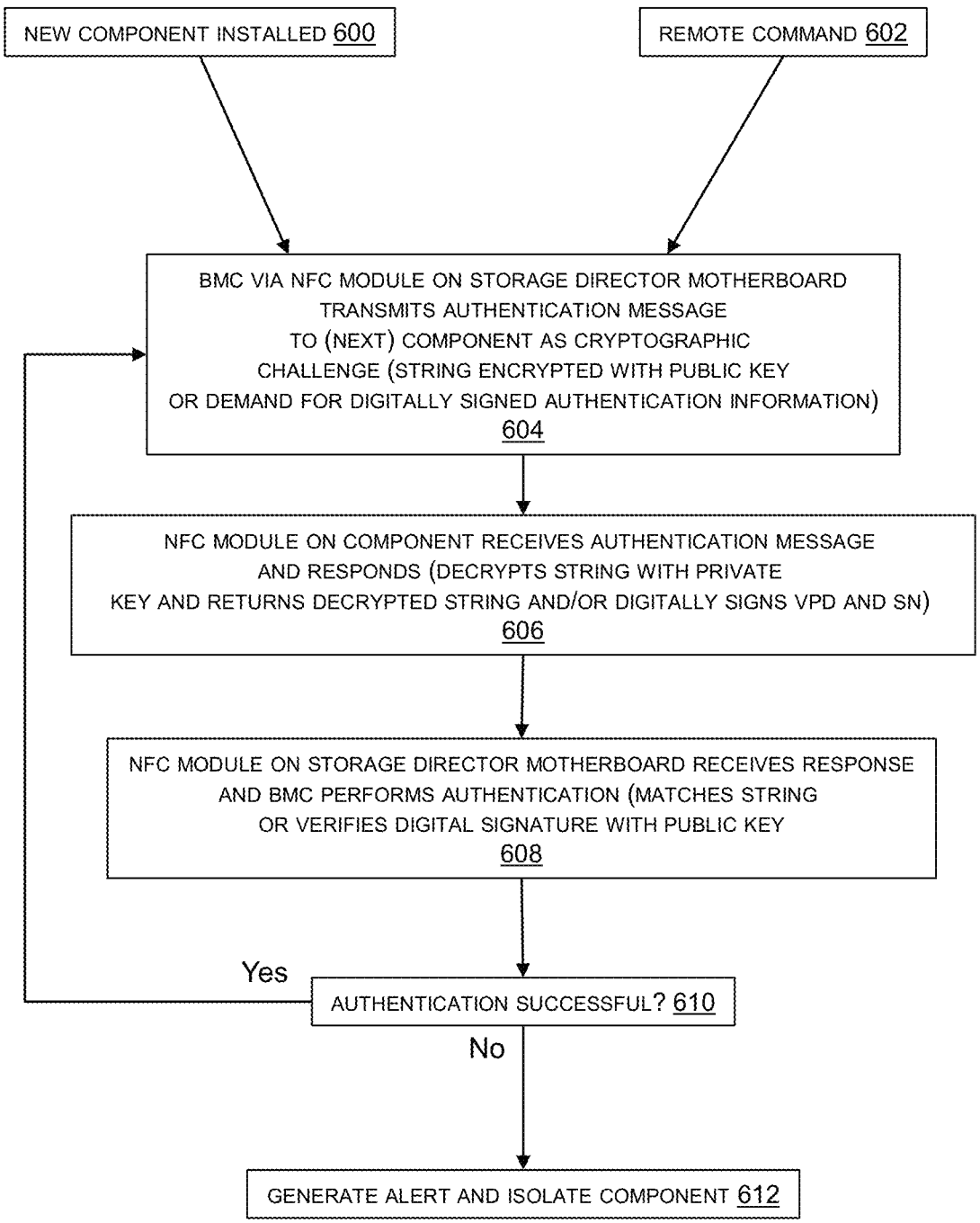
FIG. 6 illustrates a method for secure component verification using NFC.

FIG. 6 illustrates a method for secure component verification using NFC. Hardware component authentication may be initiated by remote command in step 602 or automatically when a new component is installed in step 600. In response, the BMC uses its local NFC module, which is on the same storage director motherboard, to transmit an authentication message (request or command) to the new hardware component or all monitored hardware components in series as shown in step 604. The authentication message is a cryptographic challenge. For example, the BMC may use the hardware component's public key to encrypt a string of characters. Alternatively, or additionally, the authentication message includes a demand for a digitally signed (using the hardware component's private key) reply message that includes the VPD and SN of the hardware component. As indicated in step 606, the NFC module on the targeted hardware component receives the authentication message and responds. The response may include either or both of the decrypted string and digitally signed identification information. The hardware components NFC module uses the private key of the hardware component to decrypt the encrypted string, which is returned to the BMC in decrypted form. The hardware components NFC module uses the private key of the hardware component to generate and send a digitally signed message to the BMC that includes the VPD and SN of the hardware component. As indicated in step 608, the NFC module on the storage director motherboard receives the response and the BMC uses the response to perform authentication of the hardware component. This may include either or both of matching the returned string with the string that was encrypted; and using the hardware component's public key to verify the digital signature. The VPD and SN are also matched with stored information. The replay (the challenge string encrypted by the BMC and sent to the component over NFC to decrypt and the return the original string) identifies the component as having the private key that matches the public key that the storage director has from a parts list created at the time of manufacture. Hence, a correct replay over NFC from the component indicates that the component is the original component installed at the time of manufacture of the storage system. If the authentication of the hardware component is successful as determined in step 610, then flow returns to step 604 and the next monitored hardware component, if any, is authenticated. If the authentication of the hardware component is successful as determined in step 610, then the BMC generates an alert and isolates the non-authenticated hardware component as indicated in step 612. This may include disabling communications between the hardware component and the NICs, and even disabling the NICs to disable a potential vector of attack.

Although secure component verification using NFC has been described in the context of a storage array, that should not be viewed as a limitation. The technique is also applicable to servers, switches, routers, and a wide variety of other equipment that might be subject to component substitution attacks.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    a baseboard management controller transmitting an authentication message to a hardware component using near field communications, the authentication message including a demand for digitally signed authentication information;
    the hardware component receiving the authentication message via a near field communications module integrated into the hardware component;
    the hardware component sending a reply to the authentication message using near field communications;
    the baseboard management controller receiving the reply and performing authentication of the hardware component using information in the reply; and
    generating an alert and isolating the hardware component in response to failure to authenticate the hardware component.

2. The method of claim 1 further comprising using a public key to encrypt a string that is included in the authentication message.

3. The method of claim 2 further comprising the near field communications module of the hardware component using a private key to decrypt the string.

4. The method of claim 3 further comprising the near field communications module of the hardware component including the string in the reply.

5. The method of claim 1 further comprising the near field communications module of the hardware component including a vendor product description and component serial number in the reply and digitally signing the reply with a private key.

6. An apparatus comprising:
    a baseboard management controller configured to:
        transmit an authentication message to a hardware component using near field communications and perform authentication of the hardware component using information in a reply, the authentication message including a demand for digitally signed authentication information; and
    a near field communications module integrated into the hardware component and configured to receive the authentication message, generate the reply, and send the reply to the baseboard management controller using near field communications, a vendor product description and component serial number being included in the reply and digitally signed with a private key.

7. The apparatus of claim 6 further comprising the baseboard management controller being configured to use a public key to encrypt a string that is included in the authentication message.

8. The apparatus of claim 7 further comprising the near field communications module of the hardware component being configured to use a private key to decrypt the string.

9. The apparatus of claim 8 further comprising the near field communications module of the hardware component being configured to include the string in the reply.

10. The apparatus of claim 6 further comprising the near field communications module of the hardware component being configured to include a vendor product description and component serial number in the reply and digitally sign the reply with a private key.

11. A non-transitory computer-readable storage medium storing instructions that when executed by a computer cause the computer to perform a method comprising:
    a baseboard management controller transmitting an authentication message to a hardware component using near field communications, the authentication message including a demand for digitally signed authentication information;
    the hardware component receiving the authentication message via a near field communications module integrated into the hardware component;
    the near field communications module of the hardware component using a private key to decrypt the string;
    the hardware component sending a reply to the authentication message using near field communications; and
    the baseboard management controller receiving the reply and performing authentication of the hardware component using information in the reply.

12. The non-transitory computer-readable storage medium of claim 11 in which the method further comprises using a public key to encrypt a string that is included in the authentication message.

13. The non-transitory computer-readable storage medium of claim 11 in which the method further comprises the near field communications module of the hardware component including the string in the reply.

14. The non-transitory computer-readable storage medium of claim 11 in which the method further comprises the near field communications module of the hardware component including a vendor product description and component serial number in the reply and digitally signing the reply with a private key.

* * * * *